Patented Nov. 1, 1938

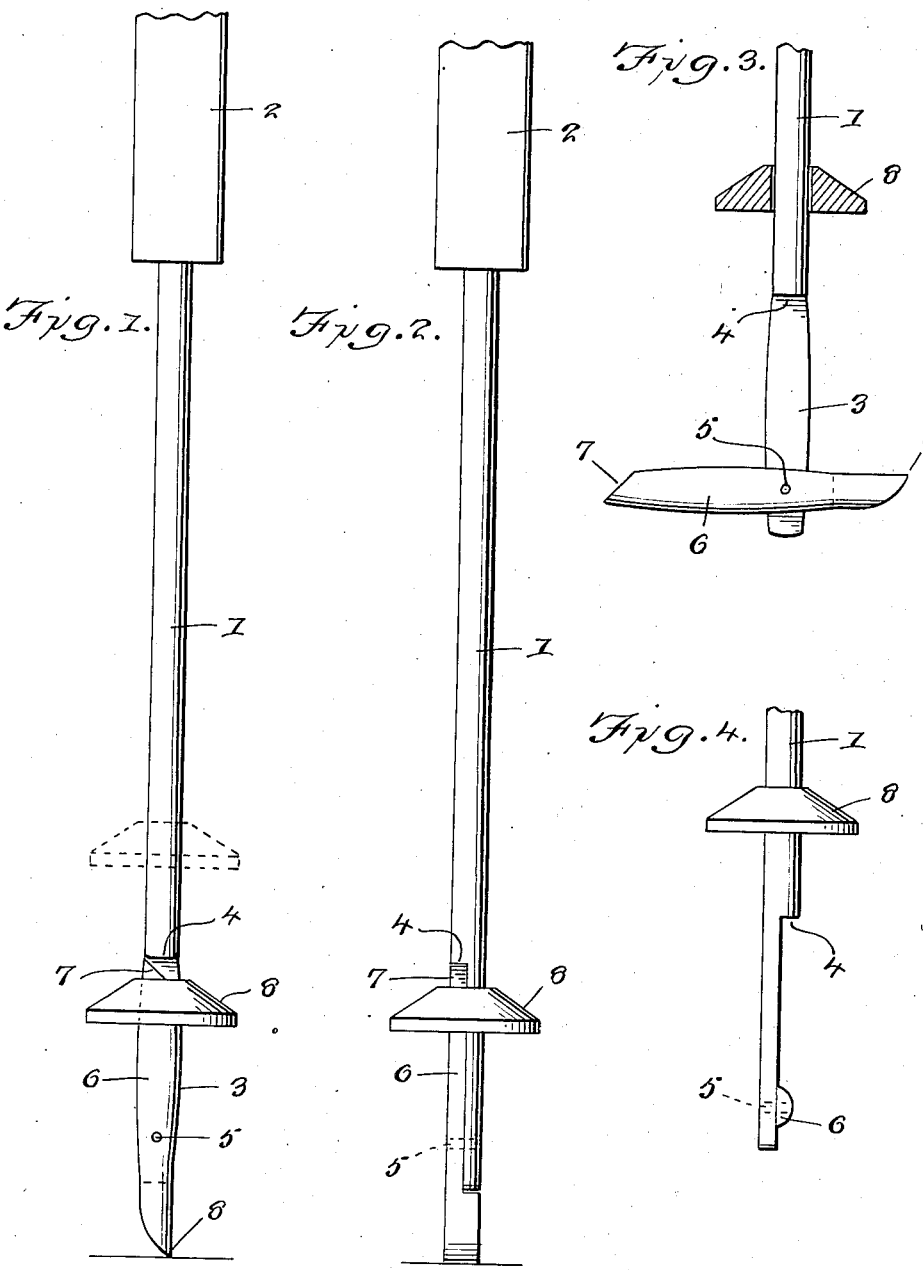

2,135,414

UNITED STATES PATENT OFFICE 2,135,414

FISH SPEAR

Roy Lee Shores, Panama City, Fla., assignor of one-half to Panama Pump Company, Panama City, Fla.

Application April 20, 1937, Serial No. 138,025

2 Claims. (Cl. 43—6)

This invention relates to fish spears especially adapted for gigging fish and has for the primary object the provision of a device of this character which will easily pass through the flesh of a fish and which automatically releases its penetrating portion for pivotal movement so that on contacting the ground it will swing at right angles to the shank of the device to retain the fish on the latter.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a fish spear constructed in accordance with my invention and showing the device arranged for gigging a fish.

Figure 2 is an edge elevation illustrating the device.

Figure 3 is a fragmentary side elevation, partly in section, showing the penetrating portion occupying a position at right angles to the shank of the device for the purpose of retaining a fish on the shank.

Figure 4 is a fragmentary edge elevation showing the reduced end portion of the shank on which is pivoted the penetrating point.

Referring in detail to the drawing, the numeral 1 indicates a rod or shank of a desired length having mounted on one end a handle 2. The shank has a portion reduced in thickness and slightly increased in width, as shown at 3. The portion 3 being reduced in thickness forms a shoulder 4. A pivot pin 5 is carried by the reduced portion 3 adjacent its free end for pivotally connecting on the portion 3 a penetrating element 6, one end of which is angularly cut, as shown at 7. The penetrating element is tapered to form a penetrating point 8. The taper is located on one side of the penetrating element, as clearly shown in Figure 1. When the penetrating element 6 is positioned to parallel the reduced portion 3 of the shank and penetrating point protrudes a limited distance beyond the free end of the reduced portion 3. The combined thickness of the portion 3 and the penetrating element 6 is substantially equal to the thickness of the shank, as shown in Figure 2, except for a slight increase in width, the purpose of which is to prevent a collar 8 from sliding off of the portion 3 in the penetrating element 6 when positioned over said parts, as shown in Figures 1 and 2. The collar 8 acts to hold the penetrating element 6 in operative position for gigging a fish. When the penetrating element and a part of the portion 3 passes through the flesh of the fish, the collar 8 will be moved upwardly on the shank thereby freeing the penetrating element 6 so that when the penetrating point 8 contacts the ground it will swing to assume the position at right angles to the shank and the portion 3 thereof, as shown in Figure 3. This will prevent the harpooned fish from passing off of the shank. It is to be understood that the body of the fish must pass the shoulder 4 before the penetrating element 6 may pivot into the position shown in Figure 3. To remove the fish it is only necessary to swing the penetrating element in parallelism with the reduced portion 3 of the shank. The fish may then be pulled off of the device. A spear of the character described will readily pass through the flesh of the fish without unduly mutilating the fish since a comparatively small hole through the fish will be made instead of a large jagged hole such as is produced by spears having a plurality of hooks or penetrating portions.

The beveled end 7 of the penetrating element will engage with the shoulder 4 when the penetrating element is in operative gigging position so as to relieve some of the strain on the pivot 5. However, when the collar moves off of the penetrating element by contacting the fish the beveled end 7 will aid in bringing about pivotal movement of the penetrating element when the latter contacts or engages with the ground due to the beveled end 7 contacting with one end of the shoulder 4.

What is claimed is:

1. A fish spear comprising a shank having one end reduced in thickness and increased in width to form an attaching portion, a pivot carried by said attaching portion, a penetrating element mounted on said pivot and of a thickness and width corresponding to the thickness and width of the attaching portion and adapted to assume a position parallel with said attaching portion when in harpooning position, and a collar slidable on said shank and movable onto the attaching portion and the penetrating element for releasably securing the penetrating element in harpooning position and adapted to be shoved onto the shank by the penetrating element passing through a fish to permit pivotal movement of the penetrating element into a position at right angles to said shank.

2. A fish spear comprising a shank having one end reduced in thickness and increased in width to form an attaching portion, a pivot carried by said attaching portion, a penetrating element mounted on said pivot and of a thickness and width corresponding to the thickness and width of the attaching portion and adapted to assume a position parallel with said attaching portion when in a harpooning position, and a collar slidable on said shank and movable onto the attaching portion and the penetrating element for releasably securing the penetrating element in harpooning position and adapted to be shoved onto the shank by the penetrating element passing through a fish to permit pivotal movement of the penetrating element into a position at right angles to said shank, said penetrating element being tapered on one side thereof and towards one end to form a penetrating point projecting beyond the free end of the attaching portion when said penetrating element is in parallelism with said attaching portion.

ROY LEE SHORES.